United States Patent
Piry et al.

(10) Patent No.: US 12,099,846 B2
(45) Date of Patent: Sep. 24, 2024

(54) SHARED UNIT INSTRUCTION EXECUTION

(71) Applicant: Arm Limited, Cambridge (GB)

(72) Inventors: Frederic Claude Marie Piry, Cagnes sur Mer (FR); Cédric Denis Robert Airaud, Saint Laurent du Var (FR); Natalya Bondarenko, Antibes (FR); Luca Maroncelli, Cambridge (GB); Geoffray Matthieu Lacourba, Nice (FR)

(73) Assignee: Arm Limited, Cambridge (GB)

( * ) Notice: Subject to any disclaimer, the term of this patent is extended or adjusted under 35 U.S.C. 154(b) by 112 days.

(21) Appl. No.: 17/396,865

(22) Filed: Aug. 9, 2021

(65) Prior Publication Data
US 2023/0042247 A1 Feb. 9, 2023

(51) Int. Cl.
*G06F 9/30* (2018.01)
*G06F 9/38* (2018.01)
*G06F 9/48* (2006.01)

(52) U.S. Cl.
CPC ........ *G06F 9/3836* (2013.01); *G06F 9/30123* (2013.01); *G06F 9/3877* (2013.01); *G06F 9/4881* (2013.01)

(58) Field of Classification Search
CPC ... G06F 9/30123; G06F 9/3836; G06F 9/3877
See application file for complete search history.

(56) References Cited

U.S. PATENT DOCUMENTS

| | | | | |
|---|---|---|---|---|
| 6,148,395 A | * | 11/2000 | Dao | G06F 9/3851 712/23 |
| 7,360,064 B1 | * | 4/2008 | Steiss | G06F 9/3851 712/214 |
| 2017/0147345 A1 | * | 5/2017 | Clevenger | G06F 9/3877 |
| 2022/0083343 A1 | * | 3/2022 | Kesiraju | G06F 11/3024 |

OTHER PUBLICATIONS

Mostafa I. Soliman, Abdulmajid F. Al-Junaid. "A shared matrix unit for a chip multi-core processor" J. Parallel Distrib. Comput. 73, (Year: 2013).*

* cited by examiner

*Primary Examiner* — Jacob Petranek
(74) *Attorney, Agent, or Firm* — NIXON & VANDERHYE P.C.

(57) ABSTRACT

A data processing apparatus comprises receiver circuitry for receiving instructions from each of a plurality of requester devices. Processing circuitry executes the instructions associated with each of a subset of the requester devices at a time and arbitration circuitry determines the subset of the requester devices and causes the instructions associated with each of the subset of the requester devices to be executed next. In response to the receiver circuitry receiving an instruction of a predetermined type from one of the requester devices outside the subset of requester devices, the arbitration circuitry causes the instruction of the predetermined type to be executed next.

11 Claims, 5 Drawing Sheets

SHARED UNIT INSTRUCTION EXECUTION

TECHNICAL FIELD

The present disclosure relates to data processing.

DESCRIPTION

In some data processing systems, a shared data processing apparatus might be provided in order to provide functionality to a number of processing units (e.g. CPUs). This is often more spatially efficient that providing a shared data processing apparatus to each CPU. In these situations, difficulties can arise when the CPU needs information from the shared data processing apparatus and the shared data processing apparatus is otherwise engaged. In particular, when the CPU needs information from the shared data processing apparatus to perform a context switch, forward progress on that CPU can halt.

SUMMARY

A data processing apparatus comprises receiver circuitry configured to receive instructions from each of a plurality of requester devices; processing circuitry to execute the instructions associated with each of a subset of the requester devices at a time; and arbitration circuitry to determine the subset of the requester devices and cause the instructions associated with each of the subset of the requester devices to be executed next, wherein in response to the receiver circuitry receiving an instruction of a predetermined type from one of the requester devices outside the subset of requester devices, the arbitration circuitry causes the instruction of the predetermined type to be executed next.

A data processing method comprises: receiving instructions from each of a plurality of requester devices; executing the instructions associated with each of a subset of the requester devices at a time; determining the subset of the requester devices; and causing the instructions associated with each of the subset of the requester devices to be executed next, wherein in response to receiving an instruction of a predetermined type from one of the requester devices outside the subset of requester devices, the instruction of the predetermined type is executed next.

A non-transitory computer-readable medium to store computer-readable code for fabrication of a data processing apparatus comprises: receiver circuitry configured to receive instructions from each of a plurality of requester devices; processing circuitry to execute the instructions associated with each of a subset of the requester devices at a time; and arbitration circuitry to determine the subset of the requester devices and cause the instructions associated with each of the subset of the requester devices to be executed next, wherein in response to the receiver circuitry receiving an instruction of a predetermined type from one of the requester devices outside the subset of requester devices, the arbitration circuitry causes the instruction of the predetermined type to be executed next.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
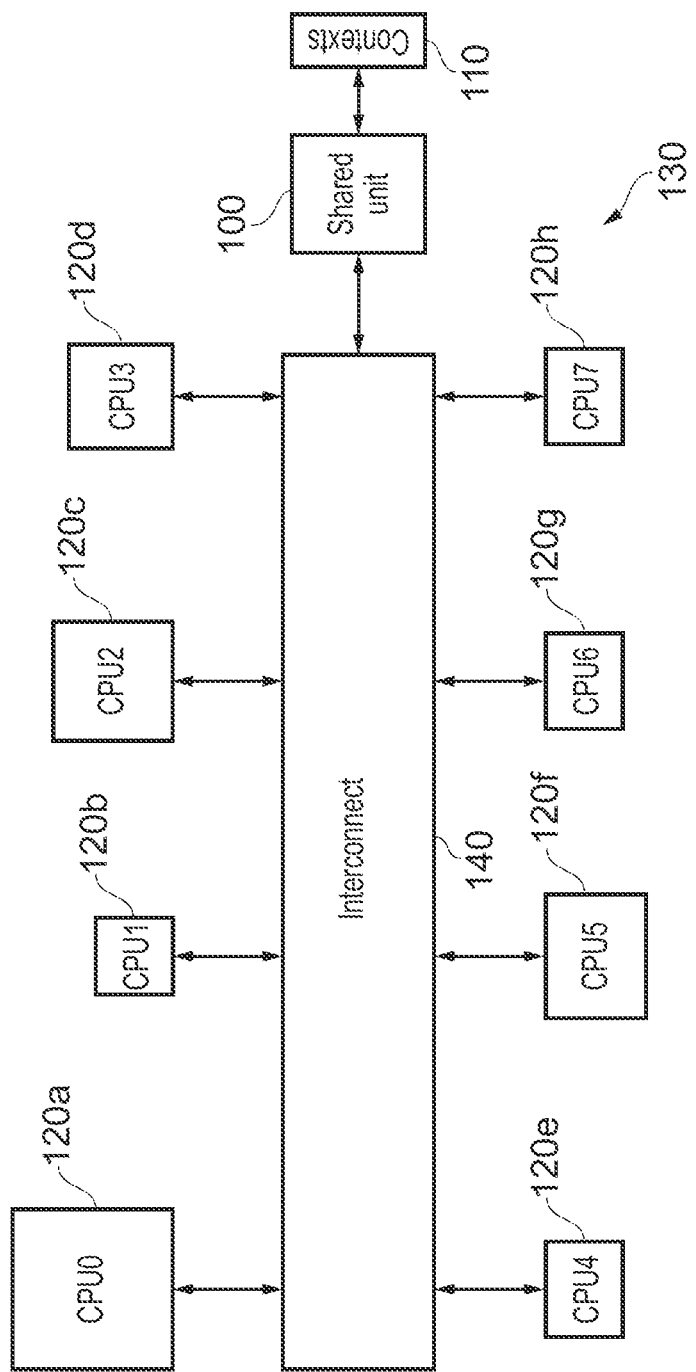
FIG. 1 schematically illustrates a system comprising a data processing apparatus in the form of a shared unit in accordance with some embodiments.

Before discussing the embodiments with reference to the accompanying figures, the following description of embodiments is provided.

In accordance with one example configuration there is provided a data processing apparatus comprising: receiver circuitry configured to receive instructions from each of a plurality of requester devices; processing circuitry to execute the instructions associated with each of a subset of the requester devices at a time; and arbitration circuitry to determine the subset of the requester devices and cause the instructions associated with each of the subset of the requester devices to be executed next, wherein in response to the receiver circuitry receiving an instruction of a predetermined type from one of the requester devices outside the subset of requester devices, the arbitration circuitry causes the instruction of the predetermined type to be executed next.

In the above aspects, the data processing apparatus is shared between a number of requester devices. The data processing apparatus' processing circuitry is such that not all of the requester devices can have their instructions executed simultaneously, and therefore a subset of the requester devices is selected by the arbitration circuitry to next be served by the processing circuitry and thereby have their instructions next executed. There are a number of possibilities for how such arbitration can be performed. However, despite the arbitration circuitry selecting the subset of requester devices that are to next to have their instructions executed, if one of the requester devices issues instructions of the predetermined type then the arbitration circuitry causes those instructions of the predetermined type to be executed next. Instructions that are not of the predetermined type (and not belonging being issued by the subset of the requester devices) are required to wait.

In some examples, the data processing apparatus comprises storage circuitry configured to store a plurality of processing contexts associated with the plurality of requester devices, wherein during execution of the instructions from one of the requester devices, one of the processing contexts associated with that one of the requester devices is read or updated. The processing contexts may include the contents of registers that are updated during execution of the instructions. Each of the contexts is associated with a different one of the requester devices. When the subset of the requester devices is changed (as a result of a reconfiguration or arbitration switch on the data processing apparatus), the contexts in the storage circuitry are saved (e.g. to context storage, which can include registers, a memory, or reserved external memory locations) and the contexts corresponding with the requester devices in the new subset are loaded into the storage circuitry. The context associated with each of the requester devices is updated as a consequence of at least some of the instructions associated with that requester device executing on the processing circuitry.

In some examples, the predetermined type comprises context accessing instructions configured to access the processing contexts stored in the storage circuitry. Other arbitration methods will also be known to the skilled person.

In some examples, the arbitration circuitry is configured to determine the subset of the requester devices based on at least one of: a priority of the instructions, a priority associated with the requester devices, a length of time that the requester devices have been waiting, and a length of time that the subset of the requester devices have had instructions executed. A requester device accesses the processing context when the requester device itself wishes to perform its own context switch. Since the context for an application that executes on a requester device may be (at least in part) on the data processing apparatus, it is necessary for that context to be accessed (e.g. read or written) in order for the context to be fully saved or restored (e.g. to memory) thereby allowing the application executing on the requester device to be changed. Since the arbitration circuitry causes such instructions to be executed next, this means that a large delay is not experienced when a context switch is to occur in respect of one of the requester devices. This itself helps to inhibit a requester device from freezing (potentially indefinitely) when a context switch is to occur on that requester device. The context accessing instruction may attempt to access a context in registers or a context that has been stored to context storage (e.g. of the data processing apparatus).

In some examples, the predetermined type comprises control instructions configured to request the start or end of transmission of the instructions for a specific requester device. Control instructions can be issued by a requester device to request to start sending (or stop sending) instructions that are to be executed by the data processing apparatus. In these situations, by enabling such instructions to be executed next by the arbitration circuitry, the arbitration circuitry can be better placed to reassess which of the requesting devices should be served next without having to, for instance, wait until the data processing apparatus performs a reconfiguration.

In some examples, the arbitration circuitry is configured to execute the instruction of the predetermined type to be executed next within a predetermined period. By configuring the arbitration in such a way that the instruction of the predetermined type will be executed within a predetermined period, the predetermined period is able to act as an upper limit as to how long it will take for instructions of the predetermined type to be executed by the processing circuitry of the data processing apparatus. This can be important where guarantees are needed as to how long it will take for certain instructions to be executed, for instance. The predetermined period is calculated from the time that the instruction is received by the receiver circuitry.

In some examples, the predetermined period is less than a reconfiguration period of the processing circuitry. Consequently, the data processing apparatus does not merely wait until the next reconfiguration of the processing circuitry in order to execute the instructions.

In some examples, the arbitration circuitry is configured, in response to issuance of the instruction of the predetermined type, to resume execution of the instructions associated with each of a subset of the requester devices. When the instruction of the predetermined type has issued (e.g. issued to an execution unit such as an Arithmetic Logic Unit ALU in the processing circuitry), the instructions that were executing on the processing circuitry (i.e. those that are associated with the subset of the requester devices) are able to resume execution.

In some examples, the subset contains exactly one of the requester devices. In these examples, the processing circuitry is only able to support execution of instructions from a single requester device at a time.

In some examples, there is provided a system comprising the above-mentioned data processing apparatus and the above-mentioned plurality of requester devices. The system could be connected via an interconnect. In these examples, the data processing apparatus is 'shared' between the requester devices.

In some examples, each requester device in the plurality of requester devices is configured to transmit the instruction of the predetermined type to the data processing apparatus in response to a desired context switch from that requester device. An operating system that is responsible for a requester device may decide to perform a context switch. When this happens, if the currently executing application on the requester device has context that is (at least in part) stored on the data processing apparatus, then the context needs to be retrieved in order that it can be saved and another application switched in. In these examples, the instruction of the predetermined type is issued so that the retrieval of the context will be quickly serviced (e.g. without having to wait for the arbitration circuitry to select the requester device as one of the subset of requester devices, which could take a long time or may not even ever occur). In this way, the context can be retrieved from the data processing apparatus quickly and so the context at the requester device can be switched out—thereby enabling another application to be executed (once that application's context has been restored using a similar mechanism). Without the instruction of the predetermined type, the requester device may be unable to execute its current application and unable to swap a new application in—essentially causing all execution on the requester device to halt.

Particular embodiments will now be described with reference to the figures.

FIG. 1 schematically illustrates a system 130 comprising a data processing apparatus 100 in the form of a shared unit. The system include a number of CPUs 120*a*, 120*b*, 120*c*, 120*d*, 120*e*, 120*f*, 120*g*, 120*h*, which are examples of the claimed receiver devices and are connected to the shared unit 100 via an interconnect 140. The shared unit provides extra functionality to each of the CPUs 120*a*, 120*b*, 120*c*, 120*d*, 120*e*, 120*f*, 120*g*, 120*h*. For example, the shared unit 100 could enable Scalable Vector Extension (SVE) instructions and/or Scalable Matrix Extension (SME) instructions to be executed. The use of the shared unit 100 may be invisible to software running on each of the CPUs 120*a*, 120*b*, 120*c*, 120*d*, 120*e*, 120*f*, 120*g*, 120*h*.

The shared unit is only capable of executing instructions from a subset (e.g. one) of the CPUs 120*a*, 120*b*, 120*c*, 120*d*, 120*e*, 120*f*, 120*g*, 120*h* at a time. The shared unit 100 therefore implements a form of multithreading in which a 'context' is provided for each of the CPUs 120*a*, 120*b*, 120*c*, 120*d*, 120*e*, 120*f*, 120*g*, 120*h*. By performing a reconfiguration (arbitration switch), the shared unit 100 is able to change which of the CPUs 120*a*, 120*b*, 120*c*, 120*d*, 120*e*, 120*f*, 120*g*, 120*h* is currently having its instructions executed. These contexts can be stored in storage circuitry 110, which could take the form of registers and/or memory and/or reserved external memory. Typically, the active context (e.g. the context belonging to the subset of the CPUs 120*a*, 120*b*, 120*c*, 120*d*, 120*e*, 120*f*, 120*g*, 120*h* whose instructions are being executed) are stored in registers while inactive contexts are stored in the memory. The reconfiguration process causes the active context to be saved to memory and the inactive context to be restored from memory back to the registers. Of course, it will be appreciated that the exact mechanism by which the contexts are stored is unimportant. A further note that is the shared unit 100 might only store part of the context—the other part of the context being stored on the relevant one of the CPUs 120a, 120b, 120c, 120d, 120e, 120f, 120g, 120h. When the application running on one of the CPUs is to be changed (e.g. if a context switch is to occur on a given CPU 120a) then part of the context switching process will involve obtaining the entirety of the context by accessing the part of the context stored on the shared unit 100 and then storing all of the context.

Note that in this example the storage circuitry 110 is shown as being separate to the shared unit 100. However, the storage circuitry 110 could also be part of the shared unit 100.

Figure 2:
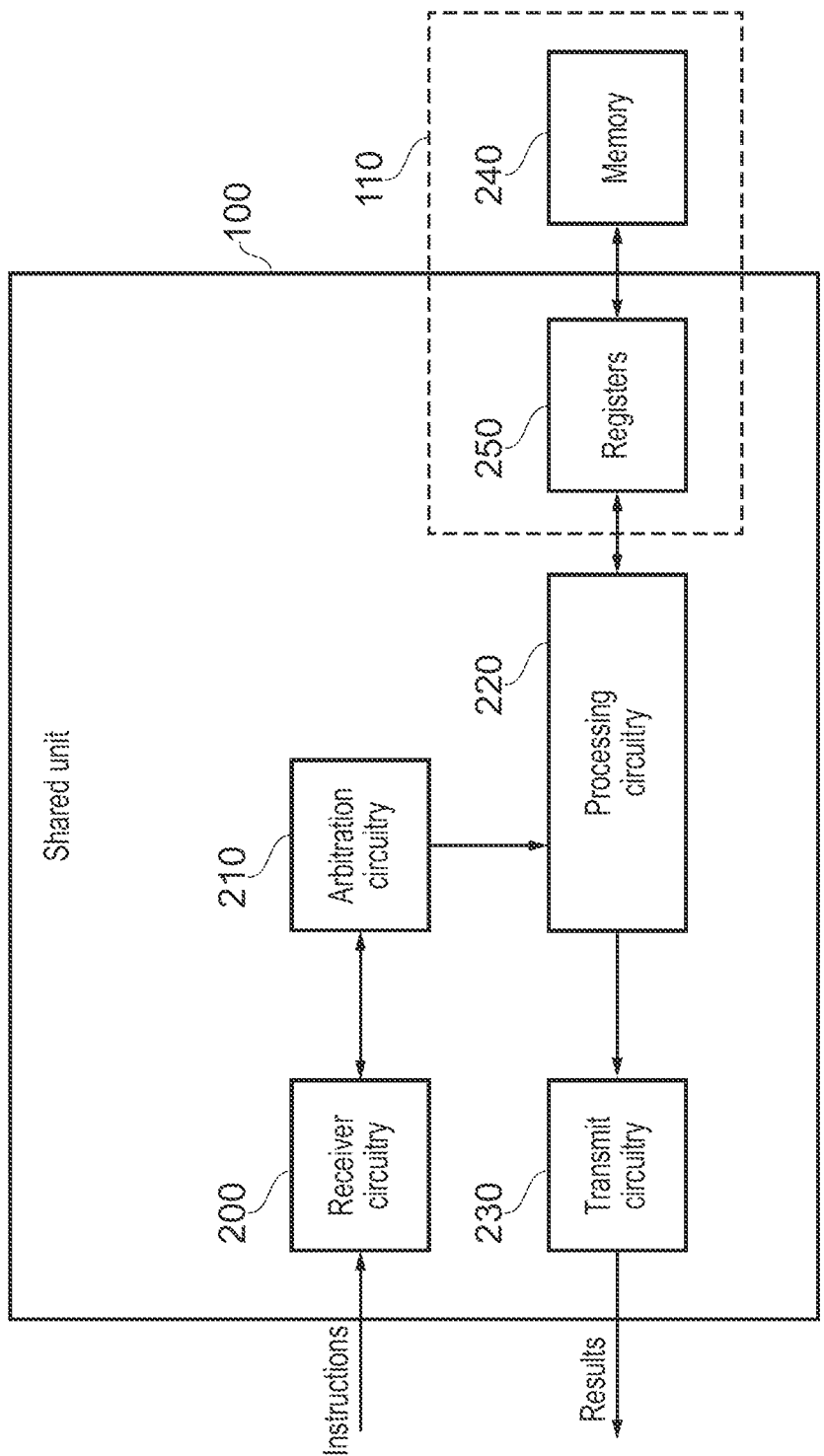
FIG. 2 schematically illustrates a data processing apparatus in accordance with some embodiments.

FIG. 2 schematically illustrates the shared unit 100 (the data processing apparatus) in more detail. Instructions to be executed are received by the receiver circuitry 200. Arbitration circuitry 210 is provided that arbitrates between the requester devices 120a, 120b, 120c, 120d, 120e, 120f, 120g, 120h to determine which one or ones are to have their instructions executed. Such arbitration can occur in a number of ways. For instance, each active application on each requester device 120a, 120b, 120c, 120d, 120e, 120f, 120g, 120h might be given a priority, and the application(s) with the highest priorities could be selected. A similar technique could involve assigning the priorities to the requester devices 120a, 120b, 120c, 120d, 120e, 120f, 120g, 120h themselves. Another technique is to select the application that has been waiting the longest to have its instructions executed. Yet another technique is to give priority to those requester devices 120a, 120b, 120c, 120d, 120e, 120f, 120g, 120h that have had the least execution time on the shared unit 100 so far—either ever or within a last period. These and other arbitration methods will be known to the skilled person together with their advantages and disadvantages. The exact arbitration method or methods used is unimportant to the invention.

Once the subset of the requester devices 120a, 120b, 120c, 120d, 120e, 120f, 120g, 120h have been selected to be active, the processing circuitry 220 processes the instructions selected by those requester devices 120a, 120b, 120c, 120d, 120e, 120f, 120g, 120h. The results of execution can be transmitted via transmit circuitry 230 (e.g. back to the relevant requester device 120a or to a main memory). In this example, the storage circuitry 110 where the contexts are stored is shown as being formed of registers 250 inside the shared unit 100 and a memory 240, which is outside the shared unit. It will be appreciated that other configurations are also possible. For instance, the registers 250 could form part of the processing circuitry 220. In another example, the memory could be stored as part of the shared unit 240. In this example, the memory 240 is used to store contexts that are no longer active after being transferred from the registers 250.

Figure 3:
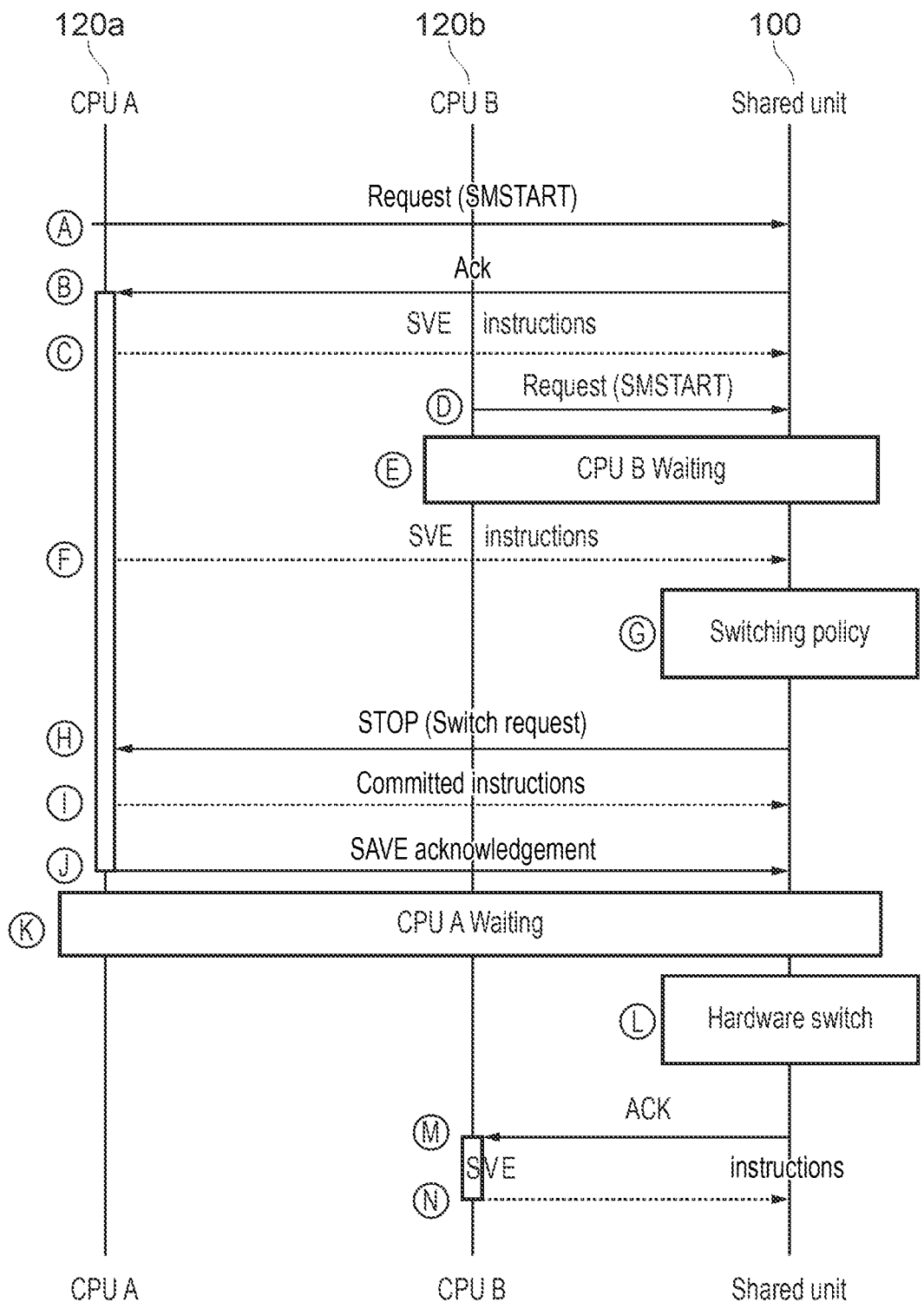
FIG. 3 shows a sequence of interactions that occurs in the absence of the present technique between requester devices in the form of a pair of CPUs and the shared unit, which can lead to a lack of forward progress on the CPUs.

FIG. 3 shows a sequence of interactions that occurs in the absence of the present technique between requester devices 120a, 120b in the form of a pair of CPUs and the shared unit 110, which can lead to a lack of forward progress on the CPUs. At a step A, CPU A 120a makes issues a control instruction (SMSTART) to the shared unit 100 to request the sending of a stream of instructions to be executed by the shared unit 100. In response, at step B, the shared unit 100 acknowledges the request thereby permitting the CPU to start sending instructions. At a step C, the stream of instructions begins. In this example, the instructions take the form of SVE or SME instructions. This process continues for some time. During this transmission of instructions, at a step D, a control instruction (SMSTART) is issued from CPU B 120b to the shared unit 100 for the CPU B 120b to start sending a stream of instructions. In this case, no acknowledgement is transmitted by the shared unit 100 meaning that the request (for now) is refused. CPU B 120b is therefore forced to wait. At a step F, the instructions continue to be streamed from CPU B 120a to the shared unit 100. At a step G, a switching policy causes the arbitration circuitry 210 to re-evaluate which of the CPUs 120a, 120b is to have instructions executed. In this case, the arbitration circuitry 210 determines that a reconfiguration should occur and that CPU B 120b should be permitted to execute instructions. Therefore, at step H, a switch request is made from the shared unit 100 to the CPU A 120a. At a step I, the instructions that have been committed inside the CPU A 120a continue to be sent and executed at the shared unit 100, but the CPU A 120a stops committing instructions as a consequence of the switch request. At a step J, once all of the committed instructions have been drained, the CPU A 120a sends a SAVE acknowledgement to indicate that the reconfiguration can happen.

At step K, execution of any instructions at the shared unit 100 from the CPU A 120a are made to wait. A hardware switch then occurs at step L. That is to say that a reconfiguration occurs at step L so that the context in the shared unit 100 that is associated with the CPU A 120a is switched out and a context associated with the CPU B 120b is switched in. At step M, an acknowledgement to the SMSTART request issued in step D is then issued from the shared unit 100 to the CPU B 120b. This causes CPU B 120b to start issuing SVE or SME instructions at step N.

In the above example, it will be appreciated that the application executing on CPU A 120a is now frozen, unable to make further progress due to requiring execution of its SVE instructions. However, the CPU A 120a cannot swap out this application with another application that does not require use of the shared unit 100 because the context for the application running on CPU A 120a is, at least in part, stored in the shared unit 100. This cannot be accessed because the arbitration circuitry 210 is instead executing instructions from CPU B 120b. Without the present technique, it would be necessary for the arbitration circuitry 210 to pass control back to CPU A 120a so that the context can be accessed—although if CPU A 120a is given control then it may wish for its SVE or SME instructions to be executed instead. Further complicating the situation is the fact that the arbitration circuitry 210 might never pass control back to the CPU A 120a. Even in a best case scenario, no forward progress can be made by CPU A 120a and in a worst case scenario, CPU A 120a is essentially rendered unusable.

The present technique enables the execution of certain instructions (those of a predetermined type) from one of the requester devices 120a to be executed, even if the arbitration circuitry 210 has not specifically selected that requester device 120a to have its instructions executed.

Figure 4:
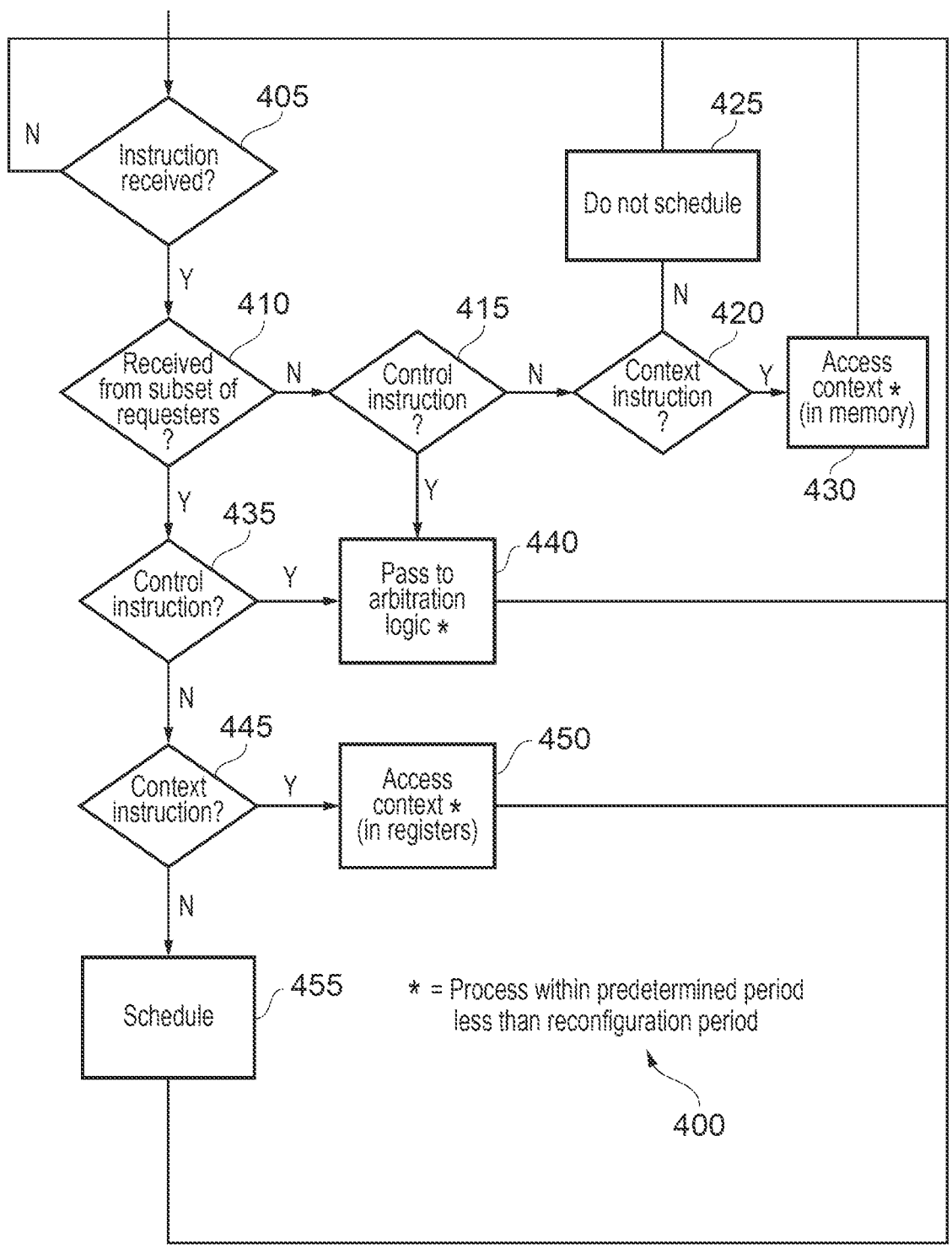
FIG. 4 is of a flow chart that illustrates a method of handling received instructions so as to overcome the lack of forward progress shown in FIG. 3 in accordance with some embodiments.

FIG. 4 illustrates a flowchart 400 that shows the present technique being applied from the perspective of the shared unit 100. The process begins at step 405 where the process waits until an instruction has been received. Once an instruction has been received, then at step 410 it is determined which requester device 120a, 120b, 120c, 120d, 120e, 120f,

120*g*, 120*h* issued the instruction and in particular, whether that requester device is one of the subset of requesters selected by the arbitration circuitry 210 as being permitted to have instructions executed.

If not then at steps 415, 420, 425, and 430, the instruction is executed if it is one of the instructions of the predetermined type. In this case, the predetermined type includes control instructions and context accessing instructions. Control instructions can be thought of as instructions that control the scheduling of the shared unit 100. For instance, these include requests to start (SM_START) and stop (SM_STOP) executing instructions for a particular CPU. The Context instructions are instructions that are used to access (e.g. clear or store or load) a context that is stored by the shared unit 100. In particular, at a step 415, it is determined whether the received instruction is a control instruction. If so, then at step 440, the instruction is passed to arbitration logic, which seeks (and in some embodiments guarantees) that the instruction will be executed in a predetermined period less than the reconfiguration period, which is the period with which reconfiguration is performed by the shared unit 100. It is therefore not necessary to simply wait for reconfiguration to take place for an instruction of the predetermined type to be executed. If the instruction is not a control instruction then at step 420, it is determined whether the instruction is a context instruction. If so, then at step 430, the context requested by the context accessing instruction is accessed. Since the instruction is received from a requester outside the subset of requesters, the context being accessed is 'inactive' and is therefore likely to be stored in memory. Again, the access request is handled within the predetermined period. If, at step 420, the instruction is not a context instruction then at step 425 the instruction is not scheduled. This is because the instruction is neither of the predetermined type nor received from one of the subset of requesters and so is not to be scheduled for execution. In some instances, the instruction is held at the CPU or the shared unit (e.g. in limited storage) until the CPU is scheduled for execution. In other instances, the instruction could be rejected (and later replayed).

If, at step 410, the instruction is received from one of the subset of requesters that have been arbitrated for execution then at step 435, it is determined whether the instruction is a control instruction. If so, then the process proceeds to step 440 as previously discussed. Otherwise, at step 445, it is determined whether the instruction is a context instruction. If so, then at step 450, the context is accessed. Since the instruction is issued by one of the subset of arbitrated requesters, the context is 'active' and so is likely to be stored in a faster storage than memory—e.g. in registers. Otherwise, the instruction is not of the predetermined type but is from one of the subset of requesters and so the instruction is scheduled.

The exact scheduling process is dependent on the implementation and is therefore unimportant to the present technique. For instance, the reconfiguration period could be changeable and in some situations could be zero. For instance, if a request is received from a CPU for which priority is higher than the CPUs in the subset then the reconfiguration period could be zero and therefore occurs 'immediately'. In some examples, the reconfiguration period is used to enable sharing of resource when dealing with requesters/CPUs that have been assigned a same priority. In addition, although the term 'reconfiguration' is used, there is no obligation that the configuration actually changes. Instead, the system merely considers whether the configuration should be changed and if it is determined that the configuration should be changed, the configuration is changed.

Figure 5:
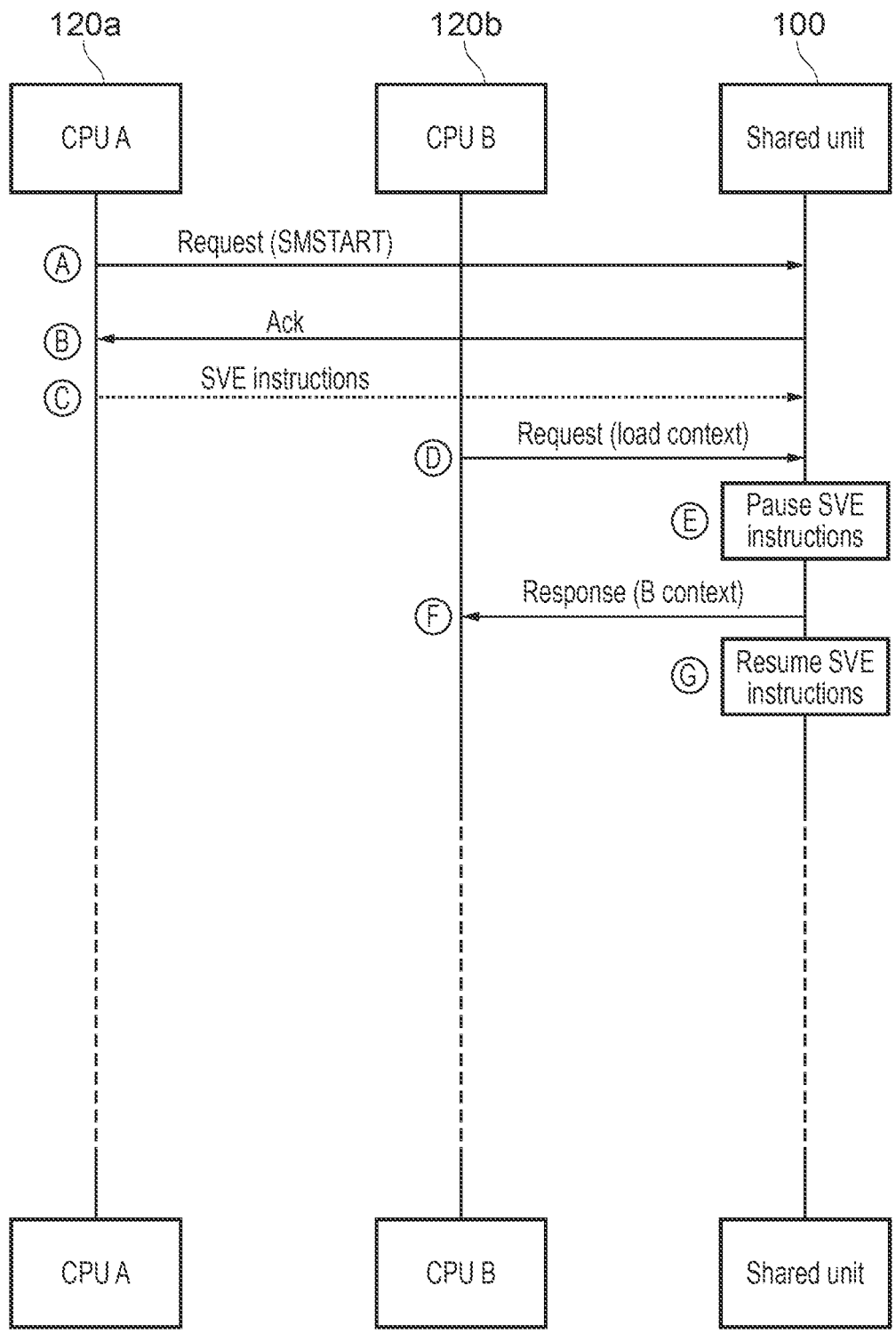
FIG. 5 shows a revised sequence of instructions that can occur, in order to reduce the lack of forward progress, in accordance with some embodiments.

In some embodiments, rather than merely ensuring that instructions of the predetermined type are executed within the predetermined period, a scheduler on the shared unit 100 will cause the instructions of the predetermined type to be executed ahead of other received instructions (resuming those received instructions when the instruction of the predetermined type has been executed). In other examples, the instructions of the predetermined type are able to execute in parallel with other instructions on the shared unit 100, FIG. 5 shows a revised sequence of instructions that can occur, in order to reduce the lack of forward progress, in accordance with some embodiments in which the shared unit 100 executes instructions from a single CPU at a time. As before, at a step A, a request (SMSTART) is issued from the CPU A 120*a* to the shared unit 100 and this is responded to with an acknowledgement in step B. SVE or SME instructions are then issued in step C from the CPU A 120*a* to the shared unit 100. This time, at a step D, a request is issued from the CPU B 120*b* to load a context. At a step E, the SVE or SME instructions that were being executed from CPU A 120*a* are paused and the request to load the context is handled, even though the arbitration circuitry 210 has not given control to CPU B 120*b*. At a step F, a response is then made containing the context associated with CPU B 120*b* and this response is sent to CPU B 120*b*. Accordingly, CPU B 120*b* can save all of the data associated with its context and an application executing on CPU B 120*b* can then be switched out. Having completed this response, the SVE or SME instructions provided by CPU A 120*a* are resumed at step G.

It can therefore be seen that with the present technique it is possible to allow some instructions (particularly those whose delay in execution can stop the forward progress of a CPU) to be executed even with the requester device that issued those instructions has not been selected by the arbitration circuitry 210 to execute instructions. By carefully selecting the instructions that can execute without having the requester node selected by the arbitration circuitry, it is possible to inhibit blocking of the CPUs.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
   receiver circuitry configured to receive instructions of a predetermined type and instructions of a type other than the predetermined type from each of a plurality of requester devices;
   processing circuitry to execute instructions associated with each of a subset of the requester devices at a time;
   arbitration circuitry to determine the subset of the requester devices according to an arbitration policy and cause the instructions associated with each of the subset of the requester devices to be executed next; and
   storage circuitry configured to store a plurality of processing contexts associated with the plurality of requester devices, wherein
   during execution of the instructions from one of the requester devices, the processing circuitry is configured to read or update one of the processing contexts associated with that one of the requester devices;
   in response to the receiver circuitry receiving an instruction of the predetermined type from one of the requester devices outside the subset of requester devices while at least one other instruction received by the receiver circuitry is yet to be executed, the arbitration circuitry is configured to cause the instruction of the predetermined type to be executed next regardless of the arbitration policy;
   in response to the receiver circuitry receiving an instruction of the type other than the predetermined type from one of the requester devices outside the subset of requester devices while at least one other instruction received by the receiver circuitry is yet to be executed, the arbitration circuitry is configured to prevent the instruction of the type other than the predetermined type from being executed regardless of the arbitration policy; and
   the predetermined type comprises context accessing instructions configured to clear, store, or load one of the processing contexts associated with a given requester device outside the subset of requester devices.

2. The data processing apparatus according to claim 1, wherein
   the arbitration circuitry is configured to determine the subset of the requester devices based on at least one of: a priority of the instructions, a priority associated with the requester devices, a length of time that the requester devices have been waiting, and a length of time that the subset of the requester devices have had instructions executed.

3. The data processing apparatus according to claim 1, wherein
   the predetermined type comprises control instructions configured to request the start or end of transmission of the instructions for a specific requester device.

4. The data processing apparatus according to claim 1, wherein
   the arbitration circuitry is configured to cause the instruction of the predetermined type to be executed next within a predetermined period.

5. The data processing apparatus according to claim 4, wherein
   the predetermined period is less than reconfiguration period of the processing circuitry.

6. The data processing apparatus according to claim 1, wherein
   the arbitration circuitry is configured, in response to issuance of the instruction of the predetermined type, to resume execution of the instructions associated with each of a subset of the requester devices.

7. The data processing apparatus according to claim 1, wherein
   the subset contains exactly one of the requester devices.

8. A system comprising:
   the data processing apparatus according to claim 1;
   the plurality of requester devices.

9. The system according to claim 1, wherein
   each requester device in the plurality of requester devices is configured to transmit the instruction of the predetermined type to the data processing apparatus in response to a desired context switch from that requester device.

10. A data processing method comprising:
    receiving instructions of a predetermined type and instructions of a type other than the predetermined type from each of a plurality of requester devices;
    executing instructions associated with each of a subset of the requester devices at a time;
    determining the subset of the requester devices; and
    causing the instructions associated with each of the subset of the requester devices to be executed next according to an arbitration policy;
    storing a plurality of processing contexts associated with the plurality of requester devices, wherein
    during execution of the instructions from one of the requester devices, one of the processing contexts associated with that one of the requester devices is read or updated;
    receiving an instruction of the predetermined type from one of the requester devices outside the subset of requester devices while at least one other instruction that has been received is yet to be executed, and in response, the instruction of the predetermined type is executed next regardless of the arbitration policy;
    receiving an instruction of the type other than the predetermined type from one of the requester devices outside the subset of requester devices while at least one other instruction that has been received is yet to be executed, and in response, the instruction of the type other than the predetermined type is prevented from being executed regardless of the arbitration policy; and
    the predetermined type comprises context accessing instructions configured to clear, store, or load one of the processing contexts associated with a given requester device outside the subset of requester devices.

11. A non-transitory computer-readable medium to store computer-readable code for fabrication of a data processing apparatus comprising:
    receiver circuitry configured to receive instructions of a predetermined type and instructions of a type other than the predetermined type from each of a plurality of requester devices;
    processing circuitry to execute instructions associated with each of a subset of the requester devices at a time; and
    arbitration circuitry to determine the subset of the requester devices according to an arbitration policy and cause the instructions associated with each of the subset of the requester devices to be executed next; and
    storage circuitry configured to store a plurality of processing contexts associated with the plurality of requester devices, wherein during execution of the instructions from one of the requester devices, one of the processing contexts associated with that one of the requester devices is read or updated;

in response to the receiver circuitry receiving an instruction of the predetermined type from one of the requester devices outside the subset of requester devices while at least one other instruction received by the receiver circuitry is yet to be executed, the arbitration circuitry causes the instruction of the predetermined type to be executed next regardless of the arbitration policy;

in response to the receiver circuitry receiving an instruction of the type other than the predetermined type from one of the requester devices outside the subset of requester devices while at least one other instruction received by the receiver circuitry is yet to be executed, the arbitration circuitry is configured to prevent the instruction of the type other than the predetermined type from being executed regardless of the arbitration policy; and the predetermined type comprises context accessing instructions configured to clear, store, or load one of the processing contexts associated with a given requester device outside the subset of requester devices.

\* \* \* \* \*